(12) United States Patent
Shao

(10) Patent No.: US 11,215,476 B2
(45) Date of Patent: *Jan. 4, 2022

(54) GAS METER QUERY OVER INTERNET OF THINGS (IOT)

(71) Applicant: Chengdu Qinchuan IoT Technology Co., Ltd., Chengdu (CN)

(72) Inventor: Zehua Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/191,404

(22) Filed: Mar. 3, 2021

(65) Prior Publication Data

US 2021/0190539 A1 Jun. 24, 2021

Related U.S. Application Data

(63) Continuation of application No. 16/834,651, filed on Mar. 30, 2020, now Pat. No. 10,969,243, which is a continuation of application No. 16/362,610, filed on Mar. 23, 2019, now Pat. No. 10,641,619.

(51) Int. Cl.
*G01D 4/00* (2006.01)
*G01D 4/16* (2006.01)
*G01D 4/02* (2006.01)

(52) U.S. Cl.
CPC .............. *G01D 4/004* (2013.01); *G01D 4/02* (2013.01); *G01D 4/16* (2013.01)

(58) Field of Classification Search
CPC ...... G01D 4/004; G01D 4/02; G01D 1004/16; H04Q 2209/60; H04Q 9/00; Y02B 90/20; Y04S 20/30
See application file for complete search history.

(56) References Cited

U.S. PATENT DOCUMENTS

| | | | |
|---|---|---|---|
| 9,534,929 B1 * | 1/2017 | Stamatakis | G06F 3/0482 |
| 10,455,393 B2 * | 10/2019 | Martin | G01D 4/02 |
| 2011/0010110 A1 * | 1/2011 | Yokohata | G01F 15/0755 702/45 |
| 2013/0304264 A1 * | 11/2013 | Shao | G01F 15/0755 700/282 |
| 2016/0142514 A1 * | 5/2016 | Stuber | H04W 4/60 709/203 |

(Continued)

*Primary Examiner* — Ojiako K Nwugo
(74) *Attorney, Agent, or Firm* — Getech Law LLC; Jun Ye

(57) ABSTRACT

The present invention provides a gas meter query method based on a compound Internet of Things (IoT) and an IoT system, and relates to the field of the IoT. The method includes: sending, by the first gas meter of a plurality of gas meters, when reading the data information corresponding to the second gas meter, the data information to the management platform via the sensor network platform; sending, by the management platform, the first control signal to the second gas meter via the sensor network platform, so that the second gas meter sends the first prompt information; sending the second prompt information to at least one of a plurality of service sub-platforms; and sending, by one of the service sub-platforms that receives the second prompt information, the second prompt information to the user sub-platform corresponding to the second gas meter.

14 Claims, 3 Drawing Sheets

(56) References Cited

U.S. PATENT DOCUMENTS

| | | | |
|---|---|---|---|
| 2017/0004324 A1* | 1/2017 | Seo | G06F 21/6227 |
| 2017/0063566 A1* | 3/2017 | Seminario | H04L 63/029 |
| 2017/0205897 A1* | 7/2017 | Chun | G06F 3/03 |
| 2017/0230497 A1* | 8/2017 | Kim | H04M 1/72454 |
| 2017/0234709 A1* | 8/2017 | Mackie | H04Q 9/00 73/861.08 |
| 2017/0244688 A1* | 8/2017 | Kim | H04L 63/0861 |
| 2017/0245026 A1* | 8/2017 | Jang | H04Q 9/00 |
| 2018/0052008 A1* | 2/2018 | Maman | G01D 4/008 |
| 2018/0285463 A1* | 10/2018 | Choi | G06F 16/9535 |
| 2019/0086235 A1* | 3/2019 | Cui | H02J 13/0086 |
| 2019/0215770 A1* | 7/2019 | Delibie | H04W 52/0216 |

* cited by examiner

GAS METER QUERY OVER INTERNET OF THINGS (IOT)

CROSS-REFERENCE TO RELATED APPLICATIONS

This application is a continuation of U.S. patent application Ser. No. 16/834,651, filed Mar. 30, 2020, which is a continuation of U.S. Pat. No. 10,641,619, issued May 5, 2020, the contents of which applications are hereby expressly incorporated herein by reference in their entirety.

TECHNICAL FIELD

The present invention relates to the field of Internet of Things (IoT), and in particular to a gas meter query method based on a compound IoT and an IoT system.

BACKGROUND

Along with ever-changing development of an IoT technology, various instruments and meters, such as a gas meter, also enter the sector of an IoT. A traditional gas meter has been gradually replaced by an IoT gas meter.

In order to facilitate the unified management of gas meters, most of the IoT gas meters in existing areas are set up together. In order to distinguish the gas meters of different users, different identification is set on different gas meters, such as labels of different users pasted on the gas meters or room numbers of different users written on the gas meters. Users can find their own gas meters quickly according to the identification set on the gas meters when they query the balance or recharge.

However, when the label on a gas meter falls off or the label on a gas meter is not set for distinguishing different users, it is difficult for a user, especially a new occupant, to find the gas meter in time, which makes it very inconvenient for the user to query the balance or recharge on the gas meter terminal.

SUMMARY

In view of this, an objective of the present invention is to provide a gas meter query method based on a compound Internet of Things (IoT) and an IoT system, so that the user can find the gas meter quickly and conveniently, and can query the gas balance and recharge easily.

To this end, the technical solutions adopted by the present invention are as follows:

According to a first aspect, the present invention provides a gas meter query method based on a compound IoT, being applied to an IoT system; the IoT system comprises a plurality of object sub-platforms, a sensor network platform, a management platform, a plurality of service sub-platforms, and a plurality of user sub-platforms; each of the object sub-platforms comprises a gas meter; the sensor network platform comprises an IoT intelligent gateway; the management platform comprises a gas company management server; the method comprises:

sending, by the first gas meter of a plurality of gas meters, when reading the data information corresponding to the second gas meter, the data information to the management platform via the sensor network platform;

sending, by the management platform, the first control signal to the second gas meter via the sensor network platform, so that the second gas meter sends the first prompt information;

sending the second prompt information to at least one of the plurality of service sub-platforms; and sending, by one of the service sub-platforms that receives the second prompt information, the second prompt information to the user sub-platform corresponding to the second gas meter.

Further, the data information comprises identification information corresponding to the second gas meter, and the step of sending, by the management platform, the first control signal to the second gas meter via the sensor network platform comprises:

sending, by the management platform, the first control signal to the second gas meter corresponding to the identification information via the sensor network platform.

Further, an indicator lamp is provided on the gas meter, and the step of sending, by the management platform, the first control signal to the second gas meter via the sensor network platform, so that the second gas meter sends the first prompt information comprises:

sending, by the management platform, the first control signal to the second gas meter via the sensor network platform, and illuminating, by the second gas meter, the indicator lamp according to the first control signal.

Further, the method comprises:

sending, by the management platform, when the gas balance of the second gas meter is less than the set threshold, the second control signal to the second gas meter via the sensor network platform, so that the second gas meter sends the third prompt information.

Further, the method comprises:

sending, by the management platform, when the gas balance of the second gas meter is less than the set threshold, the fourth prompt information to at least one of the plurality of service sub-platforms;

sending, by one of the service sub-platforms that receives the fourth prompt information, the fourth prompt information to the user sub-platform corresponding to the second gas meter.

Further, the method comprises:

estimating, by the management platform, when the gas balance of the second gas meter is less than the set threshold, the remaining gas usage time limit of the second gas meter according to the average gas consumption rate of the second gas meter, and sending the fourth prompt information to at least one of the plurality of service sub-platforms, where the fourth prompt information includes the remaining gas usage time limit.

According to a second aspect, the present invention provides an IoT system; the IoT system comprises a plurality of object sub-platforms, a sensor network platform, a management platform, a plurality of service sub-platforms, and a plurality of user sub-platforms;

when reading the data information corresponding to the second gas meter, the first gas meter of a plurality of gas meters sends the data information to the management platform via the sensor network platform;

the management platform sends the first control signal to the second gas meter via the sensor network platform, so that the second gas meter sends the first prompt information;

the second prompt information is sent to at least one of the plurality of service sub-platforms; and one of the service sub-platforms that receives the second prompt information sends the second prompt information to the user sub-platform corresponding to the second gas meter.

Further, the data information comprises identification information corresponding to the second gas meter, and the step of sending, by the management platform, the first control signal to the second gas meter via the sensor network platform comprises:

sending, by the management platform, the first control signal to the second gas meter corresponding to the identification information via the sensor network platform.

Further, an indicator lamp is provided on the gas meter, and the step of sending, by the management platform, the first control signal to the second gas meter via the sensor network platform, so that the second gas meter sends the first prompt information comprises:

sending, by the management platform, the first control signal to the second gas meter via the sensor network platform, and illuminating, by the second gas meter, the indicator lamp according to the first control signal.

Further, the data information includes the gas balance of the second gas meter;

when the gas balance of the second gas meter is less than the set threshold, the management platform further sends the second control signal to the second gas meter via the sensor network platform, so that the second gas meter sends the third prompt information.

Further, when the gas balance of the second gas meter is less than the set threshold, the management platform further sends the fourth prompt information to at least one of the plurality of service sub-platforms;

one of the service sub-platforms that receives the fourth prompt information sends the fourth prompt information to the user sub-platform corresponding to the second gas meter.

Further, when the gas balance of the second gas meter is less than the set threshold, the management platform estimates the remaining gas usage time limit of the second gas meter according to the average gas consumption rate of the second gas meter, and sends the fourth prompt information to at least one of the plurality of service sub-platforms, where the fourth prompt information includes the remaining gas usage time limit.

For the prior art, the gas meter query method based on the compound IoT and the IoT system provided by the present invention have the following beneficial effects:

The present invention provides a gas meter query method based on a compound IoT and an IoT system. The method includes: sending, by the first gas meter of a plurality of gas meters, when reading the data information corresponding to the second gas meter, the data information to the management platform via the sensor network platform; sending, by the management platform, the first control signal to the second gas meter via the sensor network platform, so that the second gas meter sends the first prompt information; sending the second prompt information to at least one of a plurality of service sub-platforms; and sending, by one of the service sub-platforms that receives the second prompt information, the second prompt information to the user sub-platform corresponding to the second gas meter. The gas meter query method based on the compound IoT and the IoT system provided by the present invention can find out the gas meter quickly by inserting the gas card into any one of the gas meters when the user queries the gas balance or recharges, which facilitates the user to query the gas balance and recharge and enhances the user experience.

To make the above objectives, characteristics and advantages of the present invention more apparent and understandable, preferred embodiments are set forth hereinafter and are described below in detail in combination with accompanying drawings.

BRIEF DESCRIPTION OF DRAWINGS

In order to describe the technical solutions of the embodiments of the present invention more clearly, the drawings that are required in the embodiments are described briefly below. It should be understood that the following drawings show only certain embodiments of the invention and should not be regarded as limit to the scope of the present invention. For ordinary technical personnels in this field, other relevant drawings may also be obtained from these drawings without creative efforts.

Figure 1:
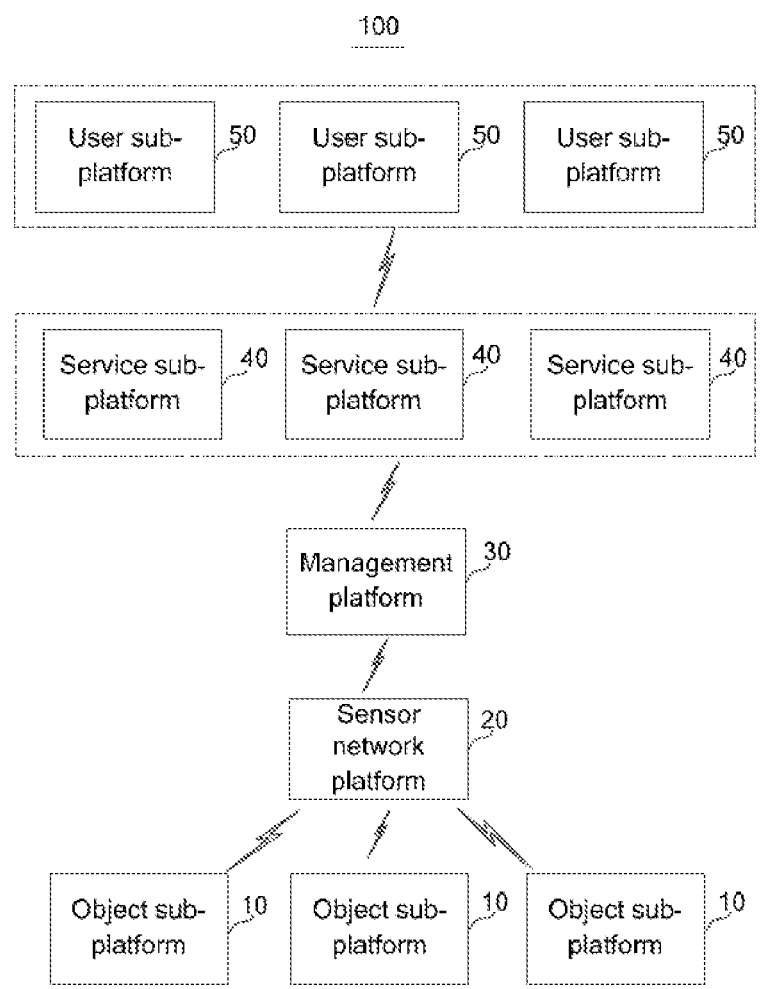
FIG. 1 is a compositional schematic diagram of an IoT system provided by an embodiment of the present invention.

Numerals in the drawings: 100—IoT system; 10—object sub-platform; 20—sensor network sub-platform; 30—management sub-platform; 40—service platform; 50—user platform.

DESCRIPTION OF EMBODIMENTS

A clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by those skilled in the art based on the embodiments of the present invention without any inventive efforts, fall into the protection scope of the present invention.

Referring to FIG. 1, a gas meter query method based on a compound IoT provided by an embodiment of the present invention is applied to an IoT system 100. The IoT system includes a plurality of object sub-platforms 10, a sensor network platform 20, a management platform 30, a plurality of service sub-platforms 40, and a plurality of user sub-platforms 50. Herein, the plurality of object sub-platforms 10 may be communicatively connected with the management platform 30 via the sensor network platform 20, so as to send the related data of the plurality of object sub-platforms 10 to the management platform 30, or receive control signals sent by the management platform 30. The management platform 30 is communicatively connected with the plurality of service sub-platforms 40, and may push the information to the plurality of service sub-platforms 40. The plurality of service sub-platforms 40 is in a one-to-one correspondence with and communicatively connected with the plurality of user sub-platforms 50. The plurality of service sub-platforms 40 may forward the information to the plurality of user sub-platforms 50 via one or more service sub-platforms 40. In this embodiment of the present invention, each of the object sub-platforms 10 comprises a gas meter; the sensor network platform 20 comprises an IoT intelligent gateway; the management platform 30 comprises a gas company management server; the service sub-platform 40 comprises a gas company operation server, a portal website server, or a government website server, etc. User sub-platforms 50 comprise user terminal devices, such as smartphones, Personal Computers (PCs), tablet computers, and Personal Digital Assistants (PDAs). The gas meter query method based on the compound IoT provided by the embodiments of the present invention is used to find out the gas meter quickly by inserting a gas card into any one of a plurality of gas meters when a user queries the gas balance or recharges on a gas meter terminal, to facilitate the user to query the gas balance and recharge.

Figure 2:
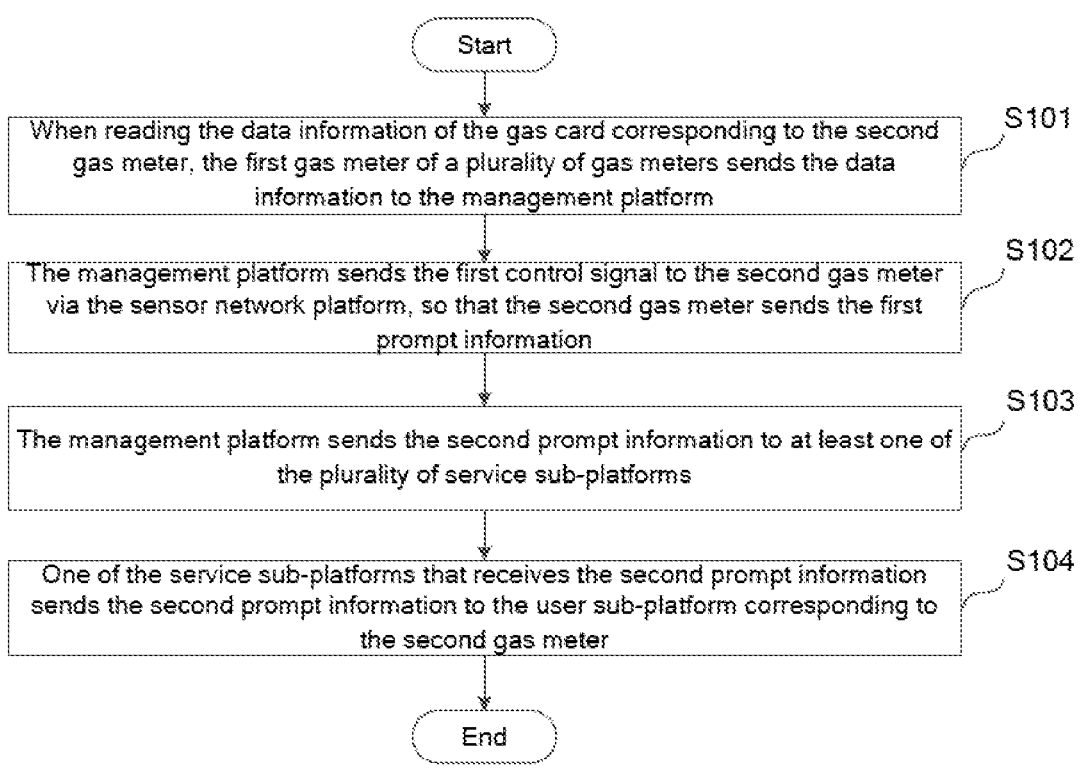
FIG. 2 is a flowchart of a gas meter query method based on a compound IoT provided by an embodiment of the present invention.

Referring to FIG. 2, it is a flowchart of a gas meter query method based on a compound IoT provided by a preferred embodiment of the present invention. The flow shown in FIG. 2 is described in detail below.

Step S101: When reading the data information of the gas card corresponding to the second gas meter, the first gas meter of a plurality of gas meters sends the data information to the management platform 30.

The method provided by the embodiment of the present invention is applied to find the corresponding gas meter from a plurality of gas meters quickly when a user queries the balance or recharges.

Specifically, the gas meter of each user corresponds to a gas card, and a user can query the gas balance of the gas meter and recharge by inserting the gas card into the corresponding gas meter. When a user needs to query the gas balance of the gas meter or recharge, and cannot correctly find out the gas meter from a plurality of gas meters, the user can insert the gas card corresponding to the gas meter into any one of the plurality of gas meters.

When the user inserts the gas card corresponding to the gas meter (which is subsequently referred to as the second gas meter for ease of description) into the gas meter of another user (which is subsequently referred to as the first gas meter for ease of description), the first gas meter reads the data information in the gas card corresponding to the second gas meter. The data information includes unique identification information corresponding to the second gas meter, and the unique identification information is used to identify the second gas meter. When the first gas meter reads the data information in the gas card corresponding to the second gas meter, the first gas meter sends the read data information to the management platform 30 via the sensor network platform 20.

Step S102: The management platform 30 sends the first control signal to the second gas meter via the sensor network platform 20, so that the second gas meter sends the first prompt information.

The management platform 30 identifies the gas meter corresponding to the read data information according to the identification information in the data information after receiving the data information read from the first gas data meter. At this moment, the management platform 30 sends the first control signal to the second gas meter via the sensor network platform 20. After receiving the first control signal sent by the management platform 30, the second gas meter sends the first prompt information according to the first control signal.

The first prompt information may be presented in a form of sound, light, etc. In this embodiment of the present invention, the presentation manner for the first prompt information is not limited. For example, an indicator lamp may be set on the gas meter, and when the second gas meter receives the first control signal sent by the management platform 30, the indicator lamp set by the second gas meter may be controlled to illuminate or flash in the manner of heartbeat. A voice output unit, such as a buzzer or a speaker, may also be set on the gas meter. After receiving the first control signal sent by the management platform 30, the second gas meter may also control the voice output unit set by the second gas meter to send a prompt voice. For another example, no other hardware is added to the gas meter. After receiving the first control signal sent by the management platform 30, the second gas meter may further control, according to the first control signal, the display screen of the second gas meter to flash in the manner of heartbeat.

Certainly, the above presentation forms of the first prompt information are merely examples for illustration, and in some other embodiments, the first prompt information may also be presented in other ways.

Step S103: The management platform 30 sends the second prompt information to at least one of the plurality of service sub-platforms 40.

While the management platform 30 sends the first control signal to the second gas meter via the sensor network platform 20, the management platform 30 further sends the second prompt information to at least one of the plurality of service sub-platforms 40, where the content table of the second prompt information is used to indicate the user that the second gas meter that sends the first prompt information is the gas meter of the user.

It should be noted that the order of step S102 and step S103 in the embodiments of the present invention is not limited.

Step S104: One of the service sub-platforms 40 that receives the second prompt information sends the second prompt information to the user sub-platform 50 corresponding to the second gas meter.

A corresponding user sub-platform 50 is pre-configured for each gas meter. After the management platform 30 sends the second prompt information to at least one of the plurality of service sub-platforms 40, one of the service sub-platforms 40 that receives the second prompt information forwards the second prompt information to the user sub-platform 50 corresponding to the second gas meter. The content of the second prompt information indicates the user that the second gas meter sending the first prompt information is the gas meter of the user, so that the user can quickly and correctly find out the gas meter according to the second prompt information and the first prompt information, to query the gas balance or recharge.

Preferably, in this embodiment of the present invention, the gas company operation server is preferably selected as the service sub-platform 40 that forwards the second prompt information to the user sub-platform 50.

In this embodiment of the present invention, the user sub-platform 50 may use, but not limited to a smartphone, a personal computer, a tablet computer, a personal digital assistant, etc., and the smartphone is the best. When the user sub-platform 50 is a smartphone, the second prompt information may be sent to the user sub-platform 50 corresponding to the second gas meter in a short message or voice manner.

For example, an indicator light is set on the gas meter, and when the first prompt information is presented in the way that the indicator light on the second gas meter flashes in the manner of heartbeat, the second prompt information may be presented with the content that "the gas meter with the indicator currently flashing is your gas meter". For another example, when gas meters are installed, the management platform 30 may pre-enter the location information of each gas meter, such as the number of rows and columns in the installation area in which each gas meter is located. In this case, the second prompt information may be a text that includes the number of rows and columns in which the gas meter is located.

In conclusion, for the gas meter query method based on the compound IoT and the IoT system provided by the embodiment of the present invention, when a user cannot identify the gas meter in a plurality of gas meters, the user can insert the gas card corresponding to the gas meter into any one of the plurality of gas meters, the gas meter inserted by the gas card reads the data information of the gas card and sends the data information to the management platform 30, and the management platform 30 identifies the gas meter of the user and controls the gas meter of the user to send the first prompt information. At the same time, the management platform 30 sends the second prompt information to the user sub-platform 50 corresponding to the gas meter of the user via the service sub-platform 40. In this way, the user can quickly find out the corresponding gas meter according to the first prompt information and the second prompt information for gas query or recharge, to facilitate the usage, enhance user experience and promote the popularization and application of the IoT system.

Figure 3:
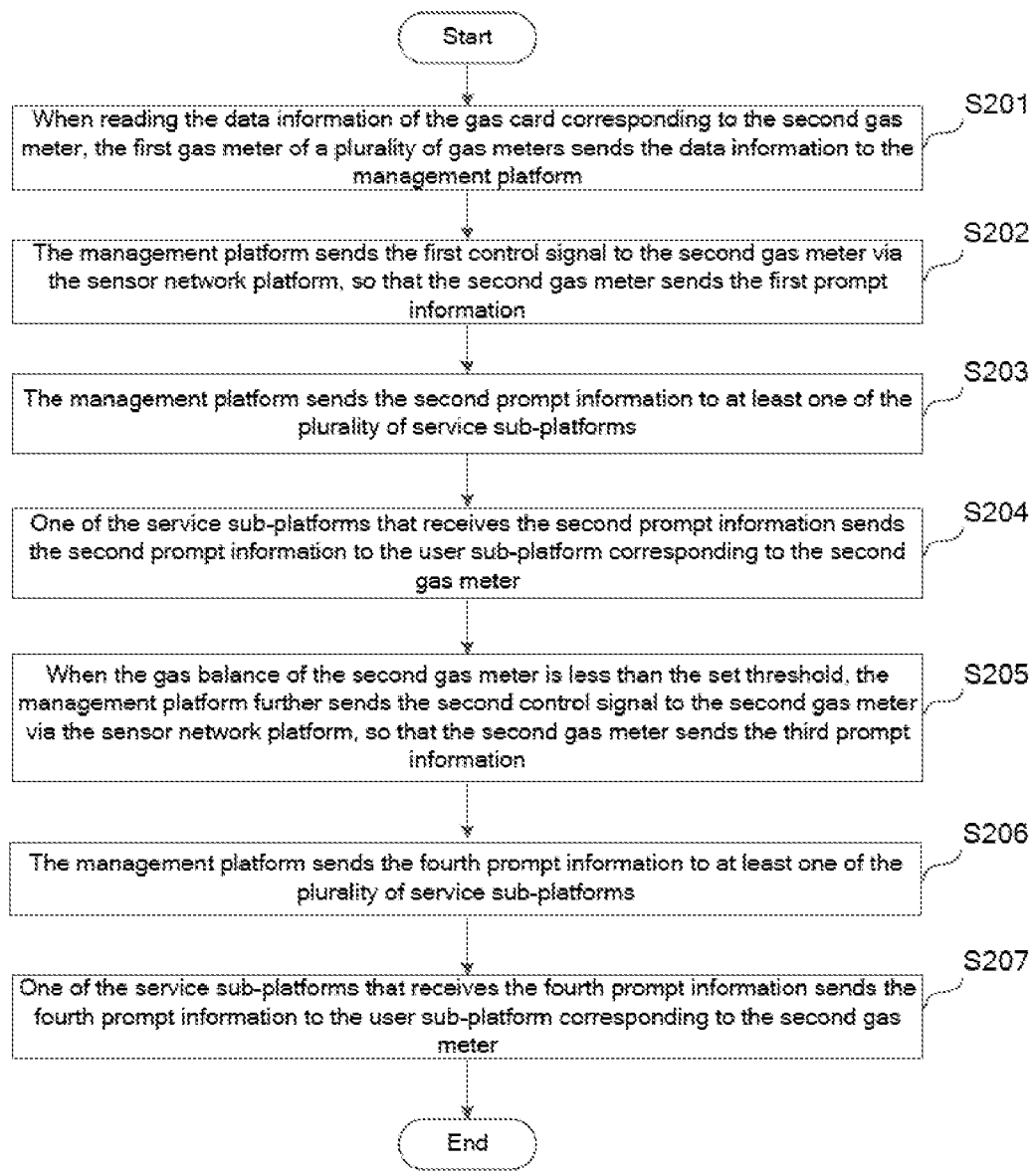
FIG. 3 is a flowchart of another gas meter query method based on a compound IoT provided by an embodiment of the present invention.

Referring to FIG. 3, it is a flowchart of another gas meter query method based on the compound IoT provided by a preferred embodiment of the present invention. The flow shown in FIG. 3 is described in detail below.

Step S201: When reading the data information of the gas card corresponding to the second gas meter, the first gas meter of a plurality of gas meters sends the data information to the management platform 30.

Step S202: The management platform 30 sends the first control signal to the second gas meter via the sensor network platform 20, so that the second gas meter sends the first prompt information.

Step S203: The management platform 30 sends the second prompt information to at least one of the plurality of service sub-platforms 40.

Step S204: One of the service sub-platforms 40 that receives the second prompt information sends the second prompt information to the user sub-platform 50 corresponding to the second gas meter.

Step S205: When the gas balance of the second gas meter is less than the set threshold, the management platform 30 further sends the second control signal to the second gas meter via the sensor network platform 20, so that the second gas meter sends the third prompt information.

The management platform 30 records the current gas balance of each gas meter. After the first gas meter sends the data information of the gas card corresponding to the second gas meter to the management platform 30, the management platform 30 further determines whether the current gas balance of the second gas meter is less than the set threshold value. If the current gas balance is less than the set threshold value, it indicates that the remaining gas of the second gas meter is almost used up. At this moment, the management platform 30 sends the second control signal to the second gas meter via the sensor network platform 20. After receiving the second control signal, the second gas meter sends the third prompt information to indicate the user that the current balance is insufficient and that the purchased gas is about to be depleted, thus urging the user to recharge in time to avoid the situation that the gas is stopped due to arrears.

The third prompt information may be displayed on the display screen of the second gas meter in the manner of a text. If the second gas meter is provided with a voice unit, the third prompt information may also be presented by sending a voice prompt via the voice unit. In this embodiment of the present invention, a presentation manner of the third prompt information is not limited.

Step S206: The management platform 30 sends the fourth prompt information to at least one of the plurality of service sub-platforms 40.

At the same time, the management platform 30 also generates the fourth prompt information according to the current gas balance of the second gas meter, and sends the fourth prompt information to at least one of the plurality of service sub-platforms 40.

In the embodiment of the present invention, the management platform 30 records gas history usage records for each gas meter, and obtains an average gas consumption rate for each gas meter according to the gas history usage records. When the first gas meter sends the data information of the gas card corresponding to the second gas meter to the management platform 30, and the current gas balance of the second gas meter is less than the set threshold, the management platform 30 further estimates the remaining gas usage time limit of the second gas meter according to the average gas consumption rate of the second gas meter and the current gas price. The generated fourth prompt information includes the remaining gas usage time limit of the second gas meter.

It should be noted that the average gas consumption rate of the gas meter in this embodiment of the present invention may refer to the average gas consumption rate of the gas meter in the previous period of time, or may refer to the average gas consumption rate of the current specific period of time (such as the average gas consumption rate of the gas meter in winter or the average gas consumption rate of the weekend), which is not specifically limited in this embodiment of the present invention.

It should be noted that, in this embodiment of the present invention, the order of step S202, step S203, step S205, and step S206 is not limited.

Step S207: One of the service sub-platforms 40 that receives the fourth prompt information sends the fourth prompt information to the user sub-platform corresponding to the second gas meter.

One of the service sub-platforms 40 that receives the fourth prompt information forwards the fourth prompt information to the user sub-platform 50 corresponding to the second gas meter. The fourth prompt information includes the remaining gas usage time limit of the second gas meter, so that the user can obtain the time that the gas purchased by the user can be normally used at the normal speed of using, and can recharge the gas in time before it is depleted, to further avoid the situation that the gas is stopped due to arrears.

In conclusion, for the gas meter query method based on the compound IoT and the IoT system provided by the embodiment of the present invention, when a user cannot identify the gas meter in a plurality of gas meters, the user can insert the gas card corresponding to the gas meter into any one of the plurality of gas meters, the gas meter inserted by the gas card reads the data information of the gas card and sends the data information to the management platform 30, and the management platform 30 identifies the gas meter of the user and controls the gas meter of the user to send the first prompt information. At the same time, the management platform 30 sends the second prompt information to the user sub-platform 50 corresponding to the gas meter of the user via the service sub-platform 40. In this way, the user can quickly find out the corresponding gas meter according to the first prompt information and the second prompt information for gas query or recharge, to facilitate the usage, enhance user experience and promote the popularization and application of the IoT system. Secondly, when the gas balance of the gas meter of the user is less than the set threshold, the management platform 30 can also control the second gas meter to send the third prompt information to prompt the user to recharge in time, estimate the remaining gas usage time according to the gas history usage records of the gas meter, and send it to the corresponding user sub-platform 50 via the service sub-platform 40, so that the user can recharge in time before the purchased gas is depleted, and further avoid the situation that the gas is stopped due to arrears.

In several embodiments provided by the present application, it should be understood that the disclosed apparatus and method may also be implemented in other manners. The described apparatus embodiments are merely exemplary. For example, the flowcharts and block diagrams in the drawings illustrate the system architecture, function, and operation of possible implementations of apparatuses, methods, and computer program products according to various embodiments of the present invention. In this regard, each block in the flowcharts or block diagrams may represent a module, program segment, or portion of code, which includes one or more executable instructions for implementing the specified logical function(s). It should also be noted that in some alternative implementation manners, the functions noted in the block may occur out of the sequence noted in the drawings. For example, two continuous blocks, in fact, may be executed concurrently, or in a reverse order, which will depend upon the functions involved. It will also be noted that each block of the block diagrams and/or flowcharts, and combinations of blocks in the block diagrams and/or flowcharts, may be implemented by a special hardware-based IoT system that performs the specified functions or acts, or by using combinations of special hardware and computer instructions.

In addition, each module in the embodiments of the present invention may exist independently, and two or more modules may be integrated into an independent part.

When a function is implemented in the form of the software functional unit and sold or used as a separate product, the function may be stored in a computer readable storage medium. Based on such understanding, the technical solutions of the present invention or the part that makes contributions to the prior art or a part of the technical solutions may be substantially embodied in a form of a software product. The computer software product is stored in a storage medium, and includes several instructions to instruct a computer device (which may be a personal computer, server, network device, or the like) to execute all or some steps of the methods described in the embodiments of the present invention. The foregoing storage medium includes: various media capable of storing a program code, such as a disk, a mobile hard disk, a Read-Only Memory (ROM), a Random Access Memory (RAM), a magnetic disk or an optical disk. It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

The above are merely preferred embodiments of the present invention, and are not intended to limit the present invention. A person skilled in the art may make various modifications and changes to the present invention. Any modification, equivalent replacement, improvement and the like made within the spirit and principle of the present invention all shall be included in a scope of protection of the present invention. It should be noted that similar reference numerals and letters refer to similar items in the following drawings, and thus once an item is defined in one drawing, it does not need to be further defined and explained in the subsequent drawings.

The foregoing descriptions are merely specific implementation manners of the present invention, but are not intended to limit a scope of protection of the present invention. Any variation or replacement readily figured out by a person skilled in the art within the technical scope disclosed in the present invention shall fall within the scope of protection of the present invention. Therefore, the scope of protection of the present invention shall be subject to the scope of protection of the claims.

It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

What is claimed is:

1. A gas meter query method based on a compound IoT, comprising:
   receiving, by a management platform via a sensor network platform, data information of a gas card from a first gas meter of a plurality of gas meters, wherein the data information is sent by the first gas meter based on a determination that the data information of the gas card corresponds to a second gas meter of the plurality of gas meters; and
   sending, by the management platform, a first control signal to the second gas meter via the sensor network platform to instruction the second gas meter to send first prompt information.

2. The gas meter query method based on the compound IoT according to claim 1, further comprising:
   sending second prompt information to at least one of a plurality of service sub-platforms; and
   sending, by one of the service sub-platforms that receives the second prompt information, the second prompt information to a user sub-platform corresponding to the second gas meter.

3. The gas meter query method based on the compound IoT according to claim 1, wherein the data information comprises identification information corresponding to the second gas meter, and the sending, by the management platform, the first control signal to the second gas meter via the sensor network platform comprises:

sending, by the management platform, the first control signal to the second gas meter corresponding to the identification information via the sensor network platform.

4. The gas meter query method based on the compound IoT according to claim 1, wherein an indicator lamp is provided on the gas meter, and sending, by the management platform, the first control signal to the second gas meter via the sensor network platform to instruct the second gas meter to send the first prompt information comprises:
sending, by the management platform, the first control signal to the second gas meter via the sensor network platform, and illuminating, by the second gas meter, the indicator lamp according to the first control signal.

5. The gas meter query method based on the compound IoT according to claim 1, wherein the method further comprises:
sending, by the management platform, when the gas balance of the second gas meter is less than a set threshold, a second control signal to the second gas meter via the sensor network platform to instruct the second gas meter to send third prompt information.

6. The gas meter query method based on the compound IoT according to claim 5, wherein the method further comprises:
sending, by the management platform, when the gas balance of the second gas meter is less than the set threshold, fourth prompt information to at least one of a plurality of service sub-platforms; and
sending, by one of the service sub-platforms that receives the fourth prompt information, the fourth prompt information to a user sub-platform corresponding to the second gas meter.

7. The gas meter query method based on the compound IoT according to claim 6, wherein the method further comprises:
estimating, by the management platform, when the gas balance of the second gas meter is less than the set threshold, a remaining gas usage time limit of the second gas meter according to an average gas consumption rate of the second gas meter, and sending the fourth prompt information to at least one of the plurality of service sub-platforms, where the fourth prompt information includes the remaining gas usage time limit.

8. An IoT system comprising:
a management platform configured to:
receive, via a sensor network platform, data information of a gas card from a first gas meter of a plurality of gas meters, wherein the data information is sent by the first gas meter based on a determination that the data information of the gas card corresponds to a second gas meter of the plurality of gas meters, and
send a first control signal to the second gas meter via the sensor network platform to instruction the second gas meter to send first prompt information.

9. The IoT system according to claim 8, wherein second prompt information is sent to at least one of a plurality of service sub-platforms; and
one of the service sub-platforms that receives the second prompt information sends the second prompt information to a user sub-platform corresponding to the second gas meter.

10. The IoT system according to claim 8, wherein the data information comprises identification information corresponding to the second gas meter, and sending, by the management platform, the first control signal to the second gas meter via the sensor network platform comprises:
sending, by the management platform, the first control signal to the second gas meter corresponding to the identification information via the sensor network platform.

11. The IoT system according to claim 9, wherein an indicator lamp is provided on the gas meter, and the step of sending, by the management platform, the first control signal to the second gas meter via the sensor network platform to instruct the second gas meter to send the first prompt information comprises:
sending, by the management platform, the first control signal to the second gas meter via the sensor network platform, and illuminating, by the second gas meter, the indicator lamp according to the first control signal.

12. The IoT system according to claim 8, wherein when the gas balance of the second gas meter is less than a set threshold, the management platform further sends a second control signal to the second gas meter via the sensor network platform to instruct the second gas meter to send third prompt information.

13. The IoT system according to claim 12, wherein when the gas balance of the second gas meter is less than the set threshold, the management platform further sends fourth prompt information to at least one of a plurality of service sub-platforms;
one of the service sub-platforms that receives the fourth prompt information sends the fourth prompt information to a user sub-platform corresponding to the second gas meter.

14. The IoT system according to claim 13, wherein when the gas balance of the second gas meter is less than the set threshold, the management platform estimates a remaining gas usage time limit of the second gas meter according to an average gas consumption rate of the second gas meter, and sends the fourth prompt information to at least one of the plurality of service sub-platforms, where the fourth prompt information includes the remaining gas usage time limit.

* * * * *